United States Patent [19]
Kronberg

[11] Patent Number: 5,245,619
[45] Date of Patent: Sep. 14, 1993

[54] GENERATION OF LOW-DIVERGENCE LASER BEAMS

[76] Inventor: James W. Kronberg, 108 Independent Blvd., Aiken, S.C. 29801

[21] Appl. No.: 817,009
[22] Filed: Jan. 3, 1992
[51] Int. Cl.$^5$ .............................................. H01S 3/13
[52] U.S. Cl. ........................................ 372/32; 372/99; 372/108; 372/98; 359/559; 359/565
[58] Field of Search ............... 372/99, 103, 98, 32; 350/162.16, 162.12

[56] References Cited

U.S. PATENT DOCUMENTS

| | | | |
|---|---|---|---|
| 3,136,959 | 6/1964 | Culver | 372/103 |
| 3,247,467 | 4/1966 | Geusic et al. | 331/94.5 |
| 3,397,024 | 8/1968 | Boyden et al. | 350/199 |
| 3,476,463 | 11/1969 | Kreuzer | 350/189 |
| 3,560,875 | 2/1971 | Macken | 331/94.5 |
| 3,577,094 | 5/1971 | Tomlinson | 372/99 |
| 3,670,260 | 6/1972 | Koester et al. | 331/94.5 |
| 3,980,397 | 9/1976 | Judd et al. | 350/162 |
| 4,498,184 | 2/1985 | O'Meara | 372/99 |
| 4,553,244 | 11/1985 | Benedict et al. | 372/95 |
| 4,887,885 | 12/1989 | Durnin et al. | 372/103 |

*Primary Examiner*—Léon Scott, Jr.
*Attorney, Agent, or Firm*—Harold M. Dixon; William R. Moser; Richard E. Constant

[57] ABSTRACT

Apparatus for transforming a conventional beam of coherent light, having a Gaussian energy distribution and relatively high divergence, into a beam in which the energy distribution approximates a single, non-zero-order Bessel function and which therefore has much lower divergence. The apparatus comprises a zone plate having transmitting and reflecting zones defined by the pattern of light interference produced by the combination of a beam of coherent light with a Gaussian energy distribution and one having such a Bessel distribution. The interference pattern between the two beams is a concentric array of multiple annuli, and is preferably recorded as a hologram. The hologram is then used to form the transmitting and reflecting zones by photo-etching portions of a reflecting layer deposited on a plate made of a transmitting material. A Bessel beam, containing approximately 50% of the energy of the incident beam, is produced by passing a Gaussian beam through such a Bessel zone plate. The reflected beam, also containing approximately 50% of the incident beam energy and having a Bessel energy distribution, can be redirected in the same direction and parallel to the transmitted beam. Alternatively, a filter similar to the Bessel zone plate can be placed within the resonator cavity of a conventional laser system having a front mirror and a rear mirror, preferably axially aligned with the mirrors and just inside the front mirror to generate Bessel energy distribution light beams at the laser source.

19 Claims, 3 Drawing Sheets

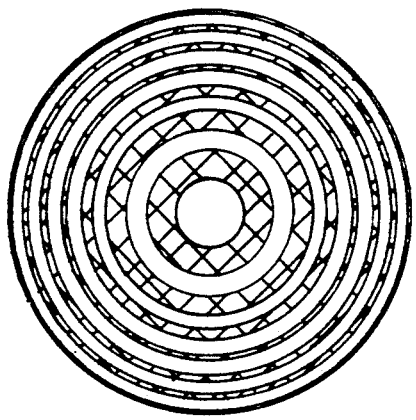
fig. 4a.
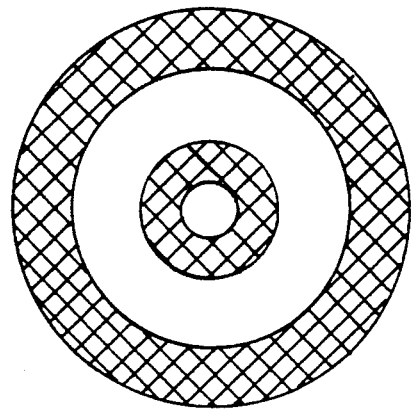
fig. 4b.
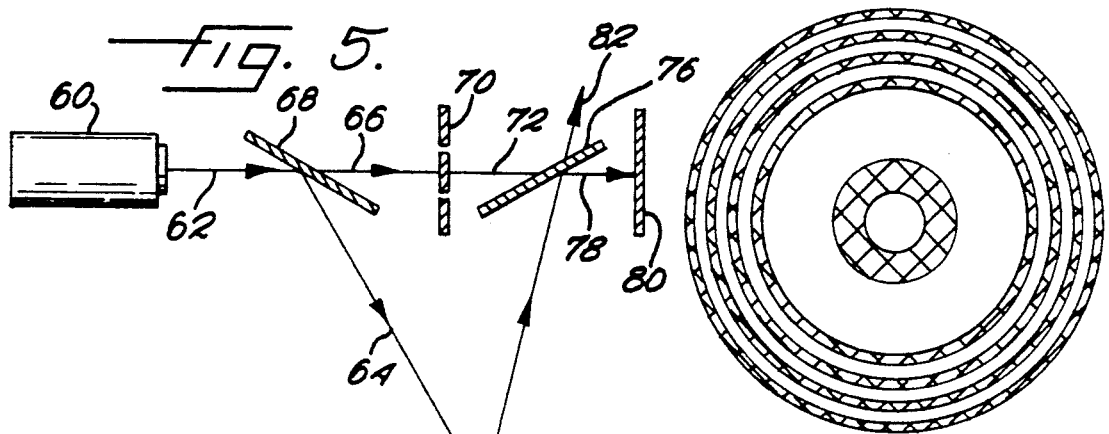
fig. 5.
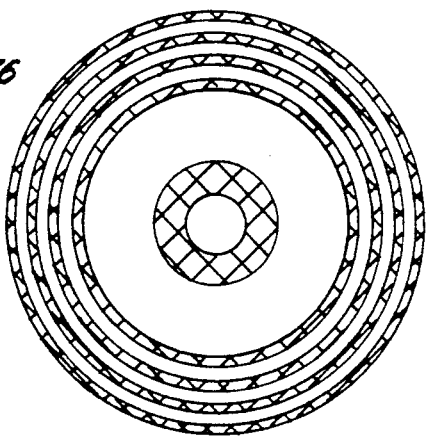
fig. 4c.
fig. 7.
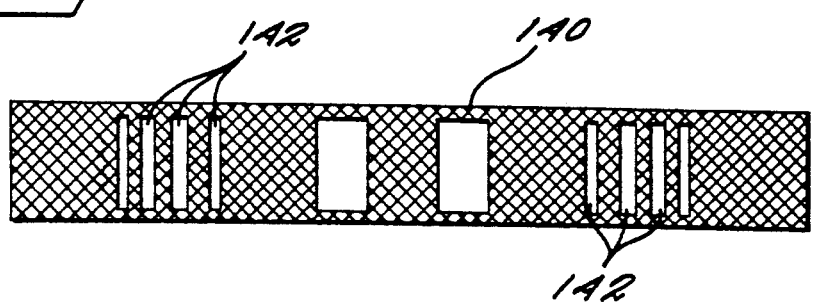

GENERATION OF LOW-DIVERGENCE LASER BEAMS

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to the transmission of light. In particular, the present invention relates to the transformation of laser beams having a Gaussian energy distribution upon their generation to beams having a Bessel energy distribution for transmission.

2. Discussion of Background

Because of diffraction effects, a laser beam diverges as it travels away from the source, its energy decreasing approximately as the square of distance from the source.

The energy distribution of a laser beam has, immediately upon generation, the familiar Gaussian form shown in FIG. 1a. Energy 10 is proportional to $e^{-x^2}$, where x is the perpendicular distance from the beam axis, and inversely proportional to the square of the distance from the source. The effective scale of x grows in proportion to this distance, i.e. the beam diverges and thereby grows weaker with distance. As illustrated schematically in FIG. 1b, laser beam 12 from source 14 has peak energy 16 and half-power width 18. Peak energy 16 decreases and half-power width 18 increases with increasing distance from source 14.

Huygens' Principle states that for any beam of energy propagating as waves, the beam after passage through any plane is indistinguishable from a beam which would be generated by an array of point sources distributed in that plane, each source releasing energy with the amplitude and phase possessed by the original beam when passing through the same point. Energy radiated in the direction of the original beam is in phase and self-reinforcing; energy radiated in other directions is randomly phased and cancels out. This principle provides a simple means of predicting the overall properties of a beam after passage, for example, through a partially-opaque mask.

A beam is termed "self-replicating" if the energy distribution generated by this interaction is the same, or very similar, at any arbitrary downstream points as in the sampling plane. Gaussian beam 12, which diverges and weakens with distance, is thus not self-replicating under Huygens' Principle.

A laser beam, diverging typically at an angle of about 1 milliradian (0.06°), expands by a factor of 10 or more over a distance of 100 meters. The smaller the starting width of the beam, the more serious the diffraction effects and the greater the divergence. Optical techniques can be used to increase the effective starting width of the beam and thereby minimize its divergence. However, these techniques are also diffraction-limited since the beam still has the basic Gaussian energy distribution.

The Gaussian distribution shown in FIG. 1a may be though of as the sum of all possible Bessel functions, much as Fourier analysis shows any periodic waveform to be a sum of sine waves. The Bessel functions are given by:

$$J_n(z) = \{2^{n+1} z^n n!\}/[\pi(2n)!]\} \int_0^{\pi/2} \cos(x \sin \phi)(\cos \phi)^{2n} d\phi,$$

where n is the order of a specific Bessel function and may be any integer from zero to infinity. The zero-order Bessel function $J_0$ represents the Gaussian central peak. The non-zero-order functions $J_1$, $J_2$, and so forth represent ring-shaped areas successively further from the center, containing successively smaller fractions of the total energy in the original Gaussian distribution as n increases. The energy density contributed by each Bessel function $J_n(z)$ is proportional to $J_n^2(z)$. Energy densities for the first three Bessel functions are shown in FIG. 2. It should be understood that each Bessel function is responsible for producing not one, but an infinite number of annular regions, with the innermost normally being the most intense.

Passing a laser beam through an annular, ring-shaped opening centered on the beam suppresses the zero-order Bessel energy distribution and most non-zero distributions as well, leaving one such non-zero distribution dominant; the result may be termed a "Bessel beam." Such a beam is more nearly self-replicating than a Gaussian beam, typically having only one-tenth the divergence of the Gaussian beam from which it was generated. However, in converting a Gaussian to such a Bessel beam, most of the incident light of the Gaussian beam, including the central peak where the intensity is highest, is blocked by the opaque area on either side of the light-transmitting annulus. As a result, the annulus transfers only a small fraction of the original Gaussian beam energy into the emergent Bessel beam. Therefore, although a laser beam having a Bessel energy distribution has lower divergence than a Gaussian beam, obtaining the Bessel distribution from the just-generated Gaussian beam results in substantial losses before any significant transmission begins.

SUMMARY OF THE INVENTION

According to its major aspects and broadly stated, the present invention is an apparatus and method for transforming a beam of coherent light having a Gaussian energy distribution into a beam of light with a Bessel energy distribution. The apparatus comprises, in the main, a plate having transmitting zones and non-transmitting zones. These zones are defined by and correspond to the light interference pattern produced when a light beam having a Gaussian energy distribution interferes with a non-zero-order Bessel energy distribution. The plate divides the beam into two approximately equal portions, a first portion that is transmitted through the plate and a second portion that is preferably reflected by the non-transmitting zones and manipulated to transmit it in the same direction and parallel to the first portion. The second, reflected portion may be manipulated by tilting the plate or by using a beam splitter to direct the second portion away from the axis of the original incident beam.

The plate is preferably made of a light-transmitting material onto which is deposited a reflecting layer. The reflecting layer can be photoetched away where the transmitting zones are to be. The pattern for the zones can be formed from beams that are circularly polarized or linearly polarized. If both portions are not needed, a light-absorbing layer can be substituted for the light-reflecting layer.

Thus, there are produced two Bessel energy distribution light beams, comprising nearly all the originally generated light and having significantly less divergence, for transmission. By the use of various polarizers and a beam splitter, these two beams can be transmitted along parallel paths, in the same direction, with a known phase relationship.

Alternatively, a Bessel beam can be generated within a laser system. A filter in the form of a Bessel zone plate as described above is placed within the resonator cavity of a conventional laser system having a front mirror and a rear mirror, preferably axially aligned with the mirrors and most preferably just inside the front mirror. The filter "spoils" lasing in some areas of the cavity, so the filter pattern is superposed on the laser beam at its source, thereby chaning the energy distribution of the beam from a Gaussian to a Bessel form.

An important feature of the present invention is the Bessel zone plate and the method for making it. The zone plate is produced by first recording the interference pattern between a Gaussian beam and a Bessel beam, preferably using a beam-splitter so that the two beams are identical in wavelength and have a controllable phase relationship. The recording may be made as a hologram, as a photographic negative or otherwise. The recording is then used to form a spatial filter or zone plate consisting of a series of transmitting and non-transmitting zones in the form of concentric annuli, each of which is capable of producing the Bessel beam. This method creates a plurality of annuli whose contributions to the beam energy are additive, resulting in much greater light transmission and thus greater conversion efficiency than in the conventional method using only one annulus. Moreover, if the non-transmitting zones are light-reflecting, the portion of the beam which is not transmitted can be recovered as a second Bessel beam.

Another feature of the present invention is the polarizing beam-splitter. The beam-splitter is oriented to have no effect on vertically-polarized light but to reflect horizontally-polarized light in a direction away from the incident beam axis. The beam-splitter thus transmits the vertically-polarized component of the incident Gaussian beam and directs it towards a first polarizer followed by the Bessel zone plate. That portion of the beam which is not transmitted by the Bessel plate as a first Bessel beam is reflected by the plate as a circularly-polarized, second Bessel beam. This beam emerges from the first polarizer as a horizontally-polarized Bessel beam which is then reflected from the internal dividing plane of the beam-splitter, exiting in a direction approximately transverse to the incident Gaussian beam. A mirror is used in this embodiment to redirect this second Bessel beam in the same direction and parallel to the transmitted beam.

Yet another feature of the present invention is the combination of a Bessel zone plate and the laser resonance cavity for generating a Bessel beam at the source. The filter may be fabricated as an integral part of the front mirror of a laser cavity.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 4a is a Fresnel zone plate;

FIG. 4b is a Gaussian zone plate;

FIG. 4c is a Bessel zone plate;

FIG. 5 is a schematic of an apparatus for producing a Bessel zone plate interference pattern according to a preferred embodiment of the present invention;

FIG. 7 is a Bessel zone plate formed from linearly polarized light according to an alternative embodiment of the present invention.

DETAILED DESCRIPTION OF A PREFERRED EMBODIMENT

The energy transmission limitation of the single light-transmitting annulus described above is overcome through the use of an array of concentric, light-transmitting annuli of suitable widths and diameters. Such an array can be generated from a hologram of the interference pattern of two suitable beams of coherent light on a photographic emulsion. One beam has a Gaussian energy distribution; the other beam has a non-zero-order Bessel distribution.

The Gaussian distribution is not self-replicating under Huygens' Principle. A beam whose energy distribution consists of a single Bessel function, on the other hand, is very nearly self-replicating, and the same is true of a beam composed chiefly of one such distribution with minor amounts of other, higher- or lower-order Bessel contributions superimposed:

$$C_1 J_1^2(x) + C_2 J_2^2(x) + \ldots + C_\infty J_\infty^2(x),$$

where x is the perpendicular distance from the beam axis and $C_1, C_2, \ldots, C_\infty$ are constants, and one of these constants is much larger than the others. This form of energy distribution is hereinafter referred to as a "multiple-order Bessel distribution," or simply a "Bessel distribution." Unlike a light beam having a Gaussian energy distribution, a beam with a Bessel energy distribution is self-replicating, as will be shown below.

Figure 3:
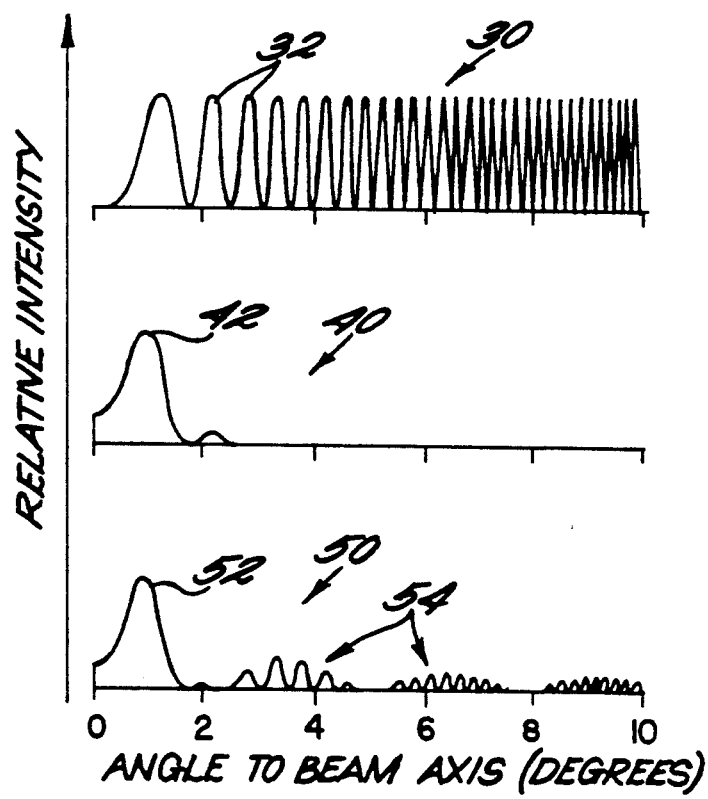
FIG. 3 shows the relative divergences of light beams having Fresnel, Gaussian and Bessel energy distributions, as calculated by Huygens' Principle.

Huygens' Principle can be used to model beams by using individual point sources to represent the beams. For example, a Fresnel beam is represented by a single point source. For light of wavelength $\lambda$, a Gaussian beam with half-power width $\sigma = 10 \lambda$ and a Bessel-type beam produced by a light-transmitting annulus of radius $\sigma$ are modeled by suitably-chosen arrays of point sources driven in phase. Far-field energy distributions are approximated by calculating the interference patterns for light from each point source interfering with a plane wave at a flat surface, parallel to and $1000\lambda$ away from the source plane. The resulting light intensities at angles from 0°–10° from the beam axis are shown in FIG. 3.

Fresnel distribution 30 does not have a well-defined power peak. Instead, power is equally divided among a plurality of concentric, ring-shaped peaks 32 extending outward from the beam axis.

In contrast, the Gaussian and Bessel beams both give Bessel-type energy distributions in the far field. The Bessel beam is therefore "self-replicating" with respect to Huygens' Principle; the Gaussian beam is not. Furthermore, Gaussian distribution 40 has main power peak 42 which is wider than main power peak 52 of Bessel distribution 50, confirming that the Bessel beam is less subject to divergence than the Gaussian beam.

Bessel distribution 50 has groups 54 of far-field fringes which do not appear in Gaussian distribution 40. Fringes 54 may tend to lose energy to central peak 52 by diffraction, gathering stray energy back into the main beam.

The interference patterns produced by interference between beams of each of these types—Gaussian, Fresnel, and Bessel—and plane (Gaussian) waves, acting on photographic line-negative film placed at the plane of interference, consist of concentric annuli of light (or transmitting) and dark (or reflecting) material having the same angular spacings as the peaks shown in FIG. 3. Such Fresnel, Gaussian, and Bessel patterns are shown in FIGS. 4a, 4b, and 4c, respectively.

Figure 1A:
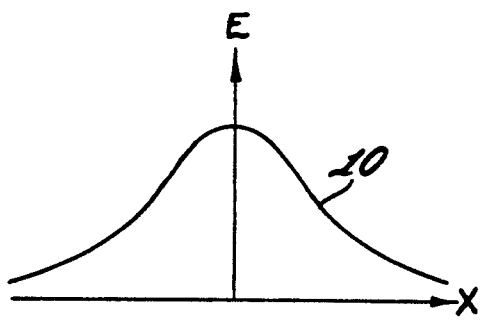
FIG. 1a is the energy distribution of a Gaussian light beam.
Figure 2:
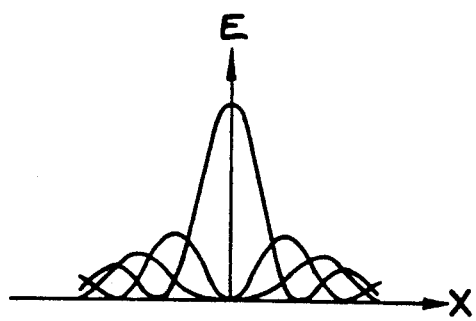
FIG. 2 is the energy distribution of the zero-order and the first two non-zero-order Bessel light beams.
Figure 1B:
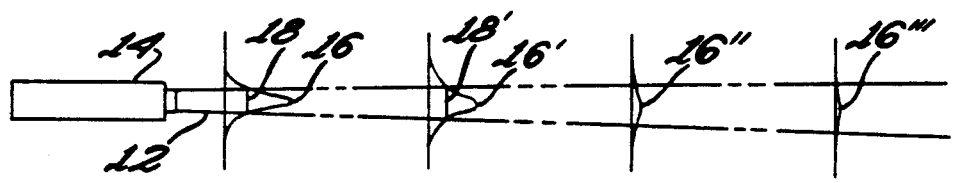
FIG. 1b is a schematic view of the divergence of a light beam having a Gaussian energy distribution.

Referring now to FIG. 5, a Bessel zone plate according to a preferred embodiment of the present invention is produced by holography. Laser system 60 generates coherent light beam 62 having a Gaussian energy distribution. Beam 62 is split into reflected beam 64 and transmitted beam 66 by first partially-silvered mirror 68. Beam 66 is directed at non-light-transmitting plate 70. Plate 70 has a single light-transmitting annular opening coaxial with beam 66. Plate 70 transmits beam 72 having an energy distribution which is strongly dominated by one of the non-zero-order Bessel functions, as shown in FIG. 2. Beam 72 is split into reflected beam 82 and a transmitted beam (not shown) by second partially-silvered mirror 76. Beam 64 is reflected by mirror 74 to second partially-silvered mirror 76, where it is combined with the transmitted portion of beam 72 into beam 78. Beam 78, containing portions of the energy from beams 64 and 72, strikes photographic plate 80. Reflected beam 82 contains the remaining energy from beams 64 and 72. The energy in beam 82 may be discarded, or, optionally, used to expose a second photographic plate (not shown).

The interference pattern between beams 64 and 72 is recorded on plate 80 as a hologram. When this hologram is illuminated by a Gaussian beam similar to beam 62, the result is not simply an image of the single annulus which generated Bessel beam 72. Instead, the image is a concentric array of all possible annuli capable of producing beam 72. The image forms a spatial filter, or Bessel zone plate, having concentric zones of light-transmitting material alternating with light-reflecting, light-absorbing, or light-scattering material, similar to the model shown in FIG. 4c. Alternatively, various power peaks in the interference pattern may produce an image with a different number of concentric zones, or zones of different widths or spacings, produced by a different phase relationship between the two interfering beams as best found by experiment.

When a beam of coherent light having a Gaussian energy distribution is directed at such a filter, the transmitted beam has a multiple-order Bessel energy distribution. The presence of multiple zones in the filter results in greater light transmission, therefore much-improved conversion efficiency over a single annulus.

In producing the hologram, delaying one of beams 64, 72 by a half-wavelength reverses its phase and thus reverses the light and dark areas in the interference pattern. This has little effect on the hologram's ability to reconstruct one beam from the other; the only difference between the reconstructions is that same half-wavelength phase shift. Similarly, either a positive or a negative image of the interference pattern works equally well in beam conversion, provided that the same amount of light is transmitted through each image. In either case, optimum performance appears with about 50% overall light transmission through the hologram.

When the interference pattern between beams 64 and 72 is recorded on photographic plate 80, areas of constructive and destructive interference are recorded as exposed and unexposed areas in the emulsion. Hence, a Bessel zone plate can be produced by standard photographic techniques. For example, a metal such as chromium may be deposited on a glass plate and then photoetched away, using the Gaussian-Bessel interference pattern as a mask, in such a way as to remove approximately 50% of the metal and leave the rest. "Positive" areas of the pattern would become transparent zones on the plate, allowing light transmission; "negative" areas, conversely, would retain their metal coating and reflect light.

Figure 6:
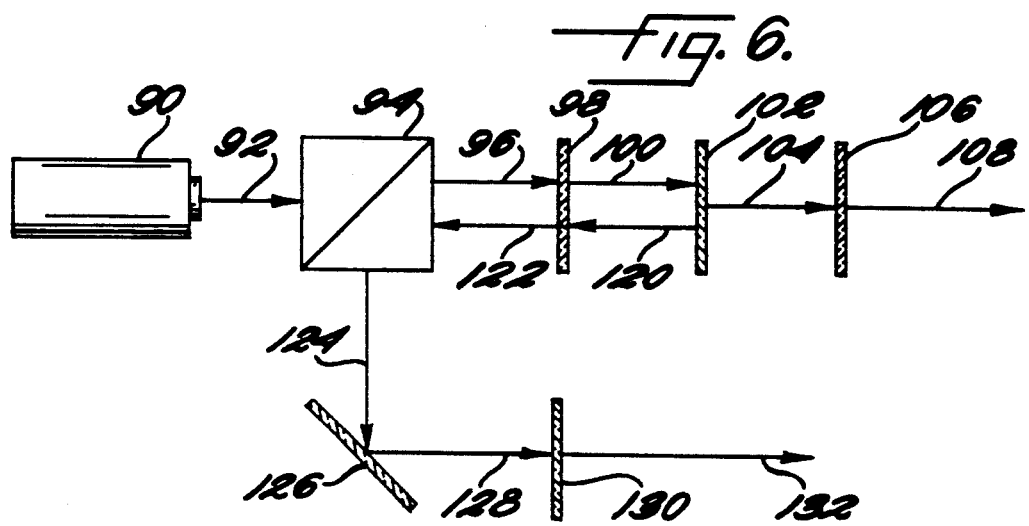
FIG. 6 is a schematic of an apparatus for generating a coherent beam of light having a Bessel energy distribution, using a Bessel zone plate according to a preferred embodiment of the present invention.

An apparatus and method for producing such a Bessel beam is shown in FIG. 6. Laser system 90, of any convenient conventional type, generates continuous or pulsed beam 92, which is coherent and substantially vertically-polarized. Beam 92 has a conventional Gaussian energy distribution. Beam 92 passes through polarizing beam-splitter 94, such as a Rochon prism, which is oriented so as to have no effect on vertically-polarized light but to reflect horizontally-polarized light away to one side. Beam 96, emerging from polarizing beam-splitter 94, is thus essentially an unaltered continuation of beam 92. It will be understood that incident beam 92 may, if convenient, be other than vertically-polarized, in which case beam-splitter 94 is oriented so as to transmit light which is linearly-polarized in a chosen direction.

Beam 96 passes through first polarizer 98, whose "fast" optical axis is tilted 45° clockwise to the beam's polarization axis as viewed from the direction of laser system 90. Polarizer 98 is preferably a quarter-wave plate such as a cleaved sheet of mica. Polarizer 98 splits beam 96 into two components having equal energy, polarized parallel and perpendicular to the "fast" axis, and introduces a relative delay of a quarter-wavelength in the perpendicular component. As a result, beam 100 emerging from polarizer 98 is circularly-polarized in a right-handed sense.

Bessel zone plate 102 is placed perpendicular to and centered on beam 100. Bessel plate 102 has concentric zones or annuli of alternating transparent and reflective material as described above and illustrated schematically in FIG. 4c, representing the interference pattern between a beam similar to beam 100 and a second beam having a Bessel energy distribution. Approximately 50% of the energy in beam 100 passes through the transparent zones of plate 102, forming Bessel beam 104 which is circularly-polarized with a Bessel energy distribution. If convenient, beam 104 may be passed through second polarizer 106, preferably a quarter-wave plate, to produce beam 108 which also has a Bessel energy distribution but is linearly-polarized in any desired direction. Bessel beam 104, or Bessel beam 108 if second polarizer 106 is present, have approximately 50% of the energy of incident Gaussian beam 92.

Approximately 50% of the energy in beam 100 is reflected back towards laser system 90 as Bessel beam 120. Since circularly-polarized light undergoes a reversal in handedness upon reflection, beam 120 is polarized in a left-handed sense. Bessel beam 120 passes through first polarizer 98, whereby beam 120 is divided into two perpendicularly-polarized components, one of which is delayed by a quarter-wavelength. Emergent beam 122 is horizontally-polarized with a Bessel energy distribution. Beam 122 is reflected from the internal dividing plane of polarizing beam-splitter 94 and exits as Bessel beam 124, in a direction approximately transverse to incident beam 92. Front-surface mirror 126 reflects beam 124 in a convenient direction, producing reflected beam 128. Alternatively, mirror 126 may be omitted. If circularly-polarized light is desired, third polarizer 130 may be placed in the path of beam 126 or beam 128 to produce circularly-polarized Bessel beam 132. Polarizer 130 is preferably a quarter-wave plate. Beam 124, and thus beam 132 if third polarizer 130 is used, have approximately 50% of the energy in incident Gaussian beam 92.

If beam 124 is not needed, it might, for example, be directed to a chamber lined with light-absorbing material which would convert it to heat. For other applications, such as long-distance interferometry, the availability of two spatially-coherent beams with Bessel energy distributions offers advantages. Often, two such beams are eventually brought together again in a distant location, and therefore preferably exit the generating apparatus in roughly parallel directions. If desirable for a particular application, front-surface mirror 126 reflects beam 124 in a direction parallel with beam 108. Bessel beam 128, containing approximately 50% of the energy in incident Gaussian beam 92, is linearly-polarized in a horizontal direction. Hence, virtually 100% of the energy of the original Gaussian beam 92 appears in the form of two complementary, virtually non-diverging Bessel-type beams with approximately equal amplitudes and a known phase relationship.

In theory, it is possible to combine Bessel beams 104 and 132 into a single output beam containing almost 100% of the original beam energy. Because of the difficulty of aligning any optical system to the needed precision, however, this may not be practicable.

Since beam 104 is inherently circularly polarized and beam 128 is inherently linearly polarized, only one of the two polarizers 106 and 130 is likely to be needed for any given application. Hence, only two polarizers need be provided: permanently-fixed first polarizer 98, and a removable polarizer which may be slipped into one of two holders, serving either as second polarizer 106 or third polarizer 130 depending upon the specific application.

If convenient, first polarizer 98 may be omitted, so linearly-polarized beam 96 is incident on Bessel zone plate 102. In that case, Bessel plate 102 is replaced with linear Bessel plate 140, shown schematically in FIG. 7. Plate 140 takes the form of a pattern of alternating linear transparent and reflective zones with widths and spacings equivalent to the circular zones shown in FIG. 4c.

Figure 8:
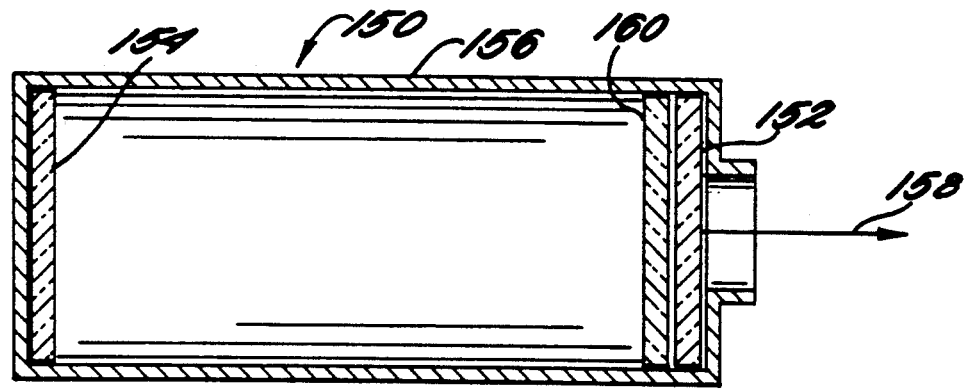
FIG. 8 is a schematic of an apparatus for generating a coherent beam of light having a Bessel energy distribution within a laser resonance cavity according to an alternative embodiment of the present invention.

Alternatively, the energy distribution of a laser beam may be changed from the Gaussian form to a Bessel form at the source. As shown in FIG. 8, laser system 150 has front mirror 152 and rear mirror 154 axially aligned within optical cavity resonator 156. Front mirror 152 is preferably flat. A medium (not shown) within cavity 156 is stimulated to produce coherent light beam 158 by means well known to those with ordinary skill in the art. Filter 160, in the form of a multiple-annulus Bessel zone plate as described above, is placed within cavity 156, preferably axially aligned with mirrors 152 and 154 and most preferably just inside front mirror 152. Filter 160 has annular zones of some convenient light-absorbing, light-reflecting, or light-scattering material alternating with transparent zones. If desired, cavity 156 is designed so that beam 158 has a conventional Gaussian energy distribution when filter 160 is removed. Alternatively, filter 160 may be fabricated as an integral part of front mirror 152, such as by photo-etching a metallized reflecting coating on the inside surface of mirror 152. Filter 160 might also be fabricated as an integral part of rear mirror 154. If mirrors 152 or 154 are curved, the zone width and spacing may need to be modified to accommodate the curvature as can best be determined by experimentation.

Filter 160 affects the cavity resonance in some areas, "spoiling" lasing in those areas; lasing in other areas is unaffected. The net result is superposition of the pattern of filter 160 on beam 158 at its source, thereby changing the energy distribution of beam 158 from a Gaussian to a Bessel form.

It will be apparent to those skilled in the art that many changes and substitutions can be made to the preferred embodiment herein described without departing from the spirit and scope of the present invention as defined by the appended claims.

What is claimed is:

1. Apparatus for transforming an energy distribution of an incident beam of light from a Gaussian energy distribution to a multiple-order Bessel energy distribution, said apparatus comprising:
    a light-transparent plate having transmitting zones and non-transmitting zones, said transmitting and non-transmitting zones defined by a pattern of light interference produced by interference of a first beam of light and a second beam of light, said first beam of light having a Gaussian energy distribution, said second beam having a zero order Bessel energy distribution, said plate filtering light so that said multiple-order Bessel energy distribution is produced when said incident beam of light from said Gaussian energy distribution is transmitted to said plate.

2. The apparatus as recited in claim 1, wherein said plate is made of a light-transparent material and said non-transmitting zones are formed by depositing a reflective material on said plate.

3. The apparatus as recited in claim 1, wherein said plate is reflecting and said non-transmitting zones are formed by depositing light-absorptive material onto said plate.

4. The apparatus as recited in claim 1, wherein said plate is transparent and said non-transmitting zones are formed by depositing a light-reflective material onto said plate.

5. The apparatus as recited in claim 1, wherein said plate is transparent and said non-transmitting zones are formed by depositing a reflective material onto said plate so that plate produces a reflected beam, said plate being tilted so that said reflected beam is reflected away from the axis of said incident beam.

6. The apparatus as recited in claim 1, wherein said plate is transparent and said non-transmitting zones are formed by depositing a reflective material onto said plate said so that said plate produces a reflected beam, said apparatus further comprising a beam splitter positioned so that said incident beam passes through said beam splitter before said plate and said reflected beam is reflected by said beam splitter.

7. The apparatus as recited in claim 1, wherein said plate is transparent and said non-transmitting zones are formed by depositing a reflective material onto said plate said so that said plate produces a reflected beam, said apparatus further comprising means for redirecting said reflected beam in the direction of and parallel to said incident beam.

8. Apparatus for producing coherent light having a multiple-order Bessel energy distribution for transmission from a source of coherent, incident light having a Gaussian energy distribution, said apparatus comprising:

a light-transparent plate having transparent zones and reflective zones, said transparent and reflecting zones defined by a pattern of light interference produced by interference of a first beam of light and a second beam of light, said first beam of light having a Gaussian energy distribution, said second beam having a zero order Bessel energy distribution, said plate filtering light so that said multiple-order Bessel energy distribution is produced when said incident beam of light from said Gaussian energy distribution is transmitted to said plate; and means for directing light reflected from said reflecting zones away from the axis of said incident light.

9. The apparatus as recited in claim 8, wherein said directing means further comprises:

a beam splitter placed in the path of said incident light for passing said incident light and reflecting said reflected light away from the axis of said incident light; and means in spaced relation to said beam splitter for redirecting said reflected light in a direction parallel to and in the same direction as said incident light.

10. The apparatus as recited in claim 8, wherein said directing means further comprises:

a polarizing beam splitter placed in the path of said incident light for passing and vertically polarizing said incident light and reflecting horizontally polarized light to one side;

a first quarter-wave plate positioned between said polarizing beam splitter and said plate for circularly polarizing said incident beam and horizontally polarize said reflected beam; and means in spaced relation to said beam splitter for redirecting said reflected light in a direction parallel to and in the same direction as said incident light.

11. The apparatus as recited in claim 10, further comprising a second quarter-wave plate positioned in the path of light transmitted by said transmitting zones, said second quarter-wave plate linearly polarizing said transmitted beam.

12. The apparatus as recited in claim 10, further comprising a second quarter-wave plate positioned in the path of light from said redirecting means, said second quarter-wave plate circularly polarizing said reflected beam.

13. The apparatus as recited in claim 10, further comprising:

a second quarter-wave plate; and means for shifting said second quarter-wave plate between said transmitted beam and said reflected beam so that said second quarter-wave plate can linearly polarize said transmitted light or circularly polarize said reflected light.

14. A method for transmitting a beam of light energy generated by a source of coherent light having a Gaussian energy distribution, said method comprising the step of:

directing said beam through a light transmitting plate having a series of transmitting zones alternating with a series of non-transmitting zones, said zones corresponding to a pattern of light interference formed by interference of a Gaussian energy distribution beam and a non-zero-order Bessel energy distribution so that a first portion of said beam is transmitted and a second portion of said beam is not transmitted through said plate.

15. The method as recited in claim 14, wherein said non-transmitting zones are reflecting zones that reflect said second portion.

16. The method as recited in claim 14, wherein said non-transmitting zones are reflecting zones that reflect said second portion and said method further comprising the steps of:

tilting said plate so that said second portion is directed away from the axis of said beam; and redirecting said second portion parallel to and in the same direction as said first portion.

17. The method of claim 16, further comprising the step of passing said first portion and said second portion through at least one means for changing the polarity of a beam of light so that the polarities of said transmitted first portion and said redirected second portion are the same.

18. The method as recited in claim 14, wherein said non-transmitting zones are reflecting zones that reflect said second portion and said method further comprising the steps:

of reflecting said reflected second portion away from the axis of said beam; and redirecting said second portion parallel to and in the same direction as said first portion.

19. The method of claim 18, further comprising the step of passing said first portion and said second portion through at least one means for changing the polarity of a beam of light so that the polarities of said transmitted first portion and said redirected second portion are the same.

* * * * *